(12) United States Patent
Bellows et al.

(10) Patent No.: US 7,380,083 B2
(45) Date of Patent: May 27, 2008

(54) MEMORY CONTROLLER CAPABLE OF LOCATING AN OPEN COMMAND CYCLE TO ISSUE A PRECHARGE PACKET

(75) Inventors: Mark D. Bellows, Rochester, MN (US); Ryan A. Heckendorf, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 11/204,411

(22) Filed: Aug. 16, 2005

(65) Prior Publication Data

US 2007/0043920 A1 Feb. 22, 2007

(51) Int. Cl.
*G06F 12/00* (2006.01)

(52) U.S. Cl. ...................................................... 711/167
(58) Field of Classification Search ................. 711/167
See application file for complete search history.

(56) References Cited

U.S. PATENT DOCUMENTS 6,310,814 B1 * 10/2001 Hampel et al. ............. 365/222

OTHER PUBLICATIONS

Rambus, Toshiba and Elpida Announce XDR DRAM, the world's fastest memory. Jul. 2003. Retrieved form the internet <http://www.elpida.com/en/news/2003/07-10.html>.*

* cited by examiner

*Primary Examiner*—Reginald G. Bragdon
*Assistant Examiner*—Aracelis Ruiz
(74) *Attorney, Agent, or Firm*—D'Ann N. Rifai; Dillon & Yudell LLP

(57) ABSTRACT

A memory controller capable of locating an open command cycle for the purpose of issuing a precharge packet to extreme data rate (XDR) dynamic random access memory (DRAM) devices is disclosed. In response to a receipt of two request packets concurrently, a determination is made as to whether one of the request packets includes a non-precharge command and the other one of the request packets includes a precharge command. If one of the request packets includes a non-precharge command and the other one of the request packets includes a precharge command, the request packet having a non-precharge command proceeds. In addition, the precharge command is deferred and its dynamic offset is adjusted accordingly.

5 Claims, 3 Drawing Sheets

MEMORY CONTROLLER CAPABLE OF LOCATING AN OPEN COMMAND CYCLE TO ISSUE A PRECHARGE PACKET

BACKGROUND OF THE INVENTION

1. Technical Field

The present invention relates to memory controllers in general. More particularly, the present invention relates to extreme data rate (XDR) memory controllers. Still more particularly, the present invention relates to an XDR memory controller capable of locating an open command cycle for the purpose of issuing a precharge packet to XDR memory devices.

2. Description of Related Art

A memory controller is typically utilized to regulate access requests (i.e., reads and writes) on memory devices from various requesting devices. After receiving an access request along with address and control information from a requesting device, the memory controller decodes the address information into bank, row and column addresses. The memory controller then sends address and control signals to the appropriate memory devices for performing the requested memory operation. For a read operation, the memory controller sends the read command and then returns the read data retrieved from the memory devices to the requesting device. For a write operation, the memory controller sends the write data to the memory devices along with the write command.

When performing a read or write operation, the memory controller is responsible for generating an appropriate sequence of control signals for accessing the desired addresses within the memory devices. The sequence of control signals for an operation typically involves activating (or opening) a row of a bank within the memory devices, then writing to or reading from the selected columns in the activated row, and finally precharging (or closing) the activated row.

Over the years, several types of dynamic random access memories (DRAMs) have been developed, such as double data rate (DDR) DRAMs, extreme data rate (XDR) DRAMs, etc. Details on XDR DRAM devices can be found in XDR DRAM specifications promulgated by Rambus[7]. It is up to designers of XDR memory controllers to not only meet the XDR DRAM specifications, but to also satisfy other design requirements such as area, power, timing, performance, etc. An "open command cycle" means that a packet may be issued on a request bus to XDR DRAMs because no other packet is currently occupying the bus. In general, there is one command per packet, although a notable exception is that two precharge commands may be contained in one precharge packet. The present disclosure provides an XDR memory controller capable of locating an open command cycle to issue a precharge packet.

SUMMARY OF THE INVENTION

In accordance with a preferred embodiment of the present invention, in response to a receipt of two request packets concurrently, a determination is made as to whether one of the request packets includes a non-precharge command and the other one of the request packets includes a precharge command. If one of the request packets includes a non-precharge command and the other one of the request packets includes a precharge command, the request packet having a non-precharge command proceeds. In addition, the precharge command is deferred and its dynamic offset is adjusted accordingly.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
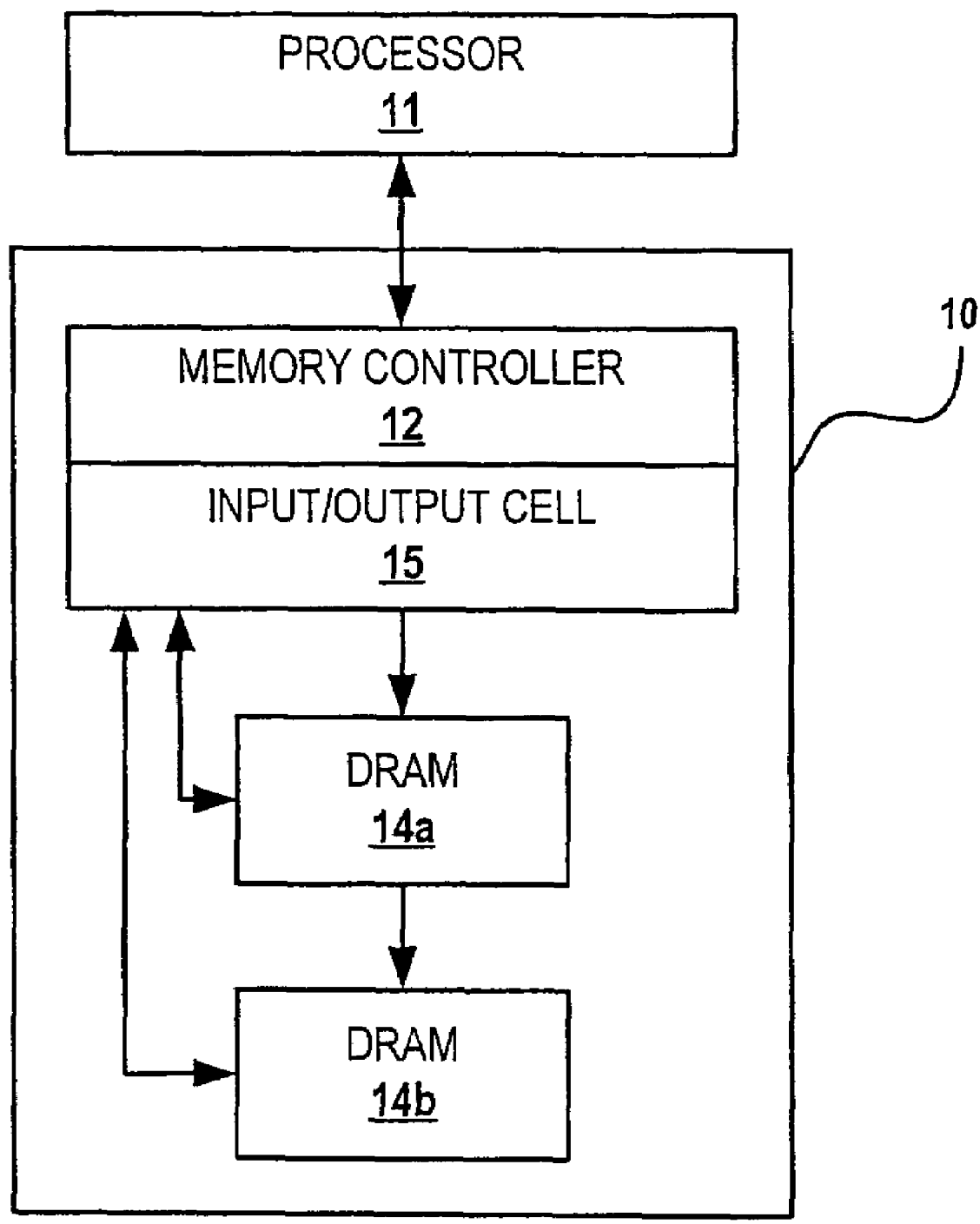
FIG. 1 is a block diagram of a memory subsystem in which a preferred embodiment of the present invention is incorporated.

Referring now to the drawings and in particular to FIG. 1, there is depicted a block diagram of an extreme data rate (XDR) memory subsystem in which a preferred embodiment of the present invention is incorporated. As shown, an XDR memory subsystem 10 includes an XDR memory controller 12 and an XDR input/output cell 15 along with two DRAM devices 14a-14b. Input/output cell 15 provides the physical layer interface between memory controller 12 and an XDR channel, and can be viewed as a serializer/deserializer for the purpose of the present invention. Details on input/output cell 15 can be found in XIO specifications promulgated by Rambus[7], the pertinent of which is incorporated by reference herein. XDR memory subsystem 10 is shown to be connected to a processor 11 by a bus, such as in a data processing system, as is well-known to those skilled in the art. DRAM devices 14a-14b are preferably XDR DRAM devices. Details on XDR DRAM devices 14a-14b can be found in XDR DRAM specifications promulgated by Rambus[7], the pertinent of which is incorporated by reference herein.

Figure 2:
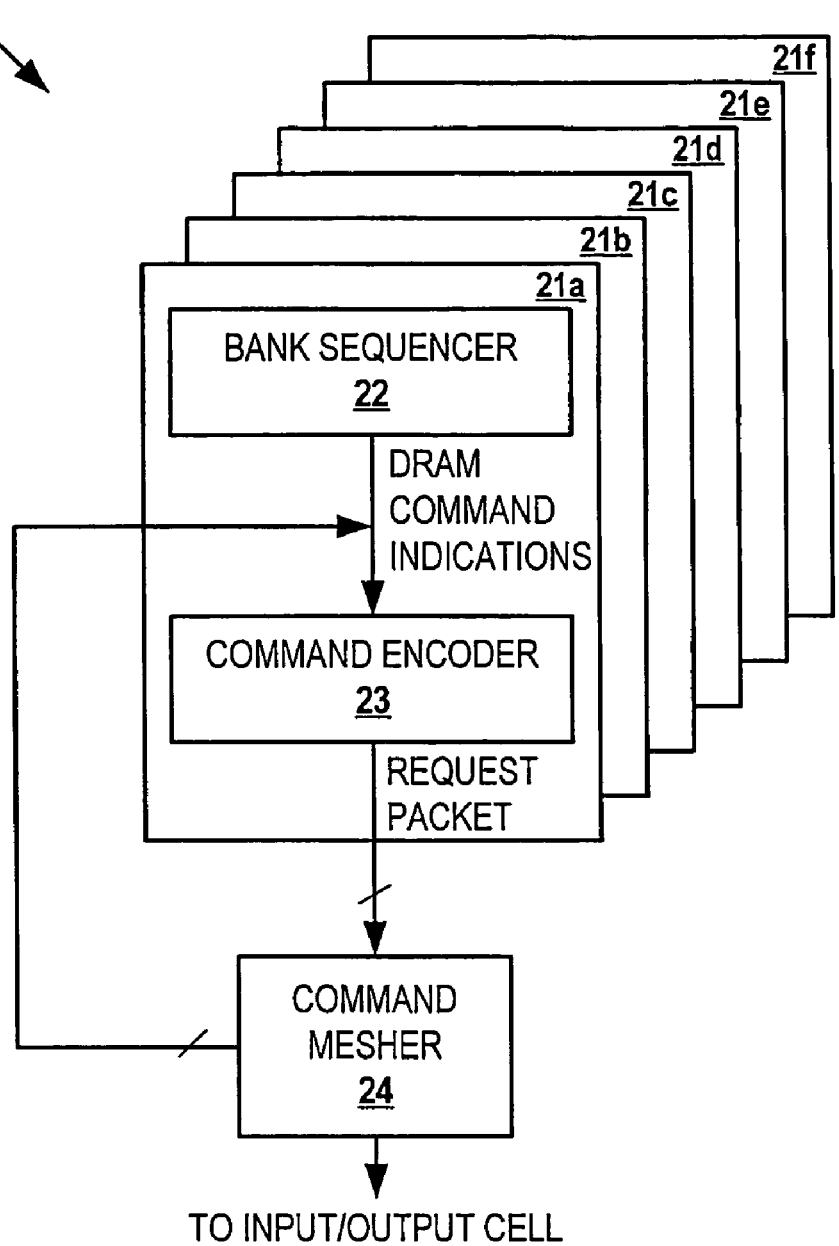
FIG. 2 is a block diagram of a portion of a memory controller within the memory subsystem from FIG. 1, in accordance with a preferred embodiment of the present invention.

With reference now to FIG. 2, there is depicted a block diagram of a portion of memory controller 12, in accordance with a preferred embodiment of the present invention. As shown, memory controller 12 includes multiple slices 21a-21f. Since slices 21a-21f are substantially identical to each other, only slice 21a is further described in detail. Slice 21a includes a bank sequencer 22 and a command encoder 23. Command encoder 23 converts DRAM command indications issued by bank sequencer 22 and command mesher 24 to corresponding request packets. Request packets from slices 21a-21f are subsequently handled by a command mesher 24 to form a request packet to be sent to an input/output cell, such as input/output cell 15 from FIG. 1, and on to DRAM devices, such as DRAM devices 14a-14b in FIG. 1.

Typically, DRAM devices allow auto precharging, which means DRAM devices automatically precharge the row some minimum time after the last column command of a read or write operation. Since the XDR architecture does not support auto precharging, it requires an explicit precharge command to "close" a row after the row has been accessed. Hence, DRAM devices 14a-14b are capable of receiving Precharge and Refresh Precharge commands. In addition, DRAM devices 14a-14b allow Precharge and Refresh Precharge commands to have dynamic offsets. A dynamic offset allows a Precharge command or a Refresh Precharge command to be executed within the XDR DRAM devices at a later time than the time at which it is issued by the memory controller, depending on the value of dynamic offset. For a Precharge command, the dynamic offset may be +3, +2, +1, or +0. Similarly, for a Refresh Precharge command, the dynamic offset may be +3, +2, +1, or +0. The Precharge or Refresh Precharge command is then delayed inside DRAM devices 14a-14b that many (3, 2, 1 or 0) command cycles before execution. The dynamic offset feature allows memory controller 12 to have more scheduling flexibility. Memory controller 12 does not use the dynamic offset capability for other, non-precharge, commands (i.e., the dynamic offset values for commands such as Activate, Read, Write, etc. are all +0).

Bank sequencer 22 can issue Precharge+3 or Refresh Precharge+3 command indications at appropriate times. The command indications are preferably in the form of pulses that can be sent to command encoder 23 and command mesher 24. Effective row-asserted time (i.e., $t_{RAS}$) counters and register settings inside the memory controller control the timing of Precharge+3 pulses and Refresh Precharge+3 pulses.

For the XDR DRAM devices in the present embodiment, there is always at least one command cycle within four consecutive command cycles that is not used for an Act (i.e., an Activate or a Refresh Activate) command or a Col (i.e., a Read, Write, or Masked Write) command. Thus, a row precharge (ROWP) packet can be issued at such point. A ROWP packet may contain one or two precharge commands. For example, two precharge commands in one ROWP packet may be necessary on an Early Read After Write turnaround (Early Read After Write is an XDR DRAM feature that may be used to improve performance). Other request packet types only contain one command.

Since there is no interaction between bank sequencers within memory controller 12, bank sequencer 22 in slice 21a is not aware of the operations of bank sequencers in slices 21b-21f. As such, the responsibility of collision detection and avoidance (i.e., delaying of precharge commands when necessary) lies upon command mesher 24. Command mesher 24 also merges two Precharge commands (or one Precharge command and one Refresh Precharge command) into one row precharge (ROWP) packet if they occur at the same time.

Command mesher 24 includes precharge merging logic for handling Precharge and Refresh Precharge commands as follows:
(1) if two Precharge commands arrive at the same time, one of the Precharge commands is moved to the Refresh Precharge field (i.e., POP field to ROP field) of the ROWP packet; and
(2) if one Precharge command and one Refresh Precharge command arrive at the same time, nothing special needs to be done.

Eventually, a logical OR function is utilized to combine the two precharge commands into one ROWP packet. Two precharge commands may arrive at the same time on a write-to-read turnaround with Early Read enabled. Since two Refresh Precharge commands should never arrive at command mesher 24 at the same time, such case can be ignored.

The following outputs from bank sequencer 22 to command mesher 24 are for the purpose of collision detection:
(1) Do Non-precharge Command (1 bit): Asserted with any Do Act or Do Col indication. This output is used for collision detection between a precharge command and an Act or Col (i.e., non-precharge) command. It is also used to prevent bits of a legitimate Col packet from being moved by the precharge merging logic (since it has no precharge field).
(2) Do Any Col (1 bit): Asserted with any Do Col indication. A signal equivalent to this is created inside of command encoder 23. Inside command encoder 23, this equivalent signal is used to abort the generation of a ROWP packet, since bank sequencer 22 can issue a Precharge+3 pulse at the same time as a Col command pulse in an "extreme" configuration. Of course, the Precharge+3 collision with the Col command is detected, and the Col command wins and the Precharge+3 becomes a Precharge+2 and tries again (described below). Inside command mesher 24, this signal asserted is used to prevent the request packet input from the same slice from being blocked (which would be a Col command in this case).

Figure 3:
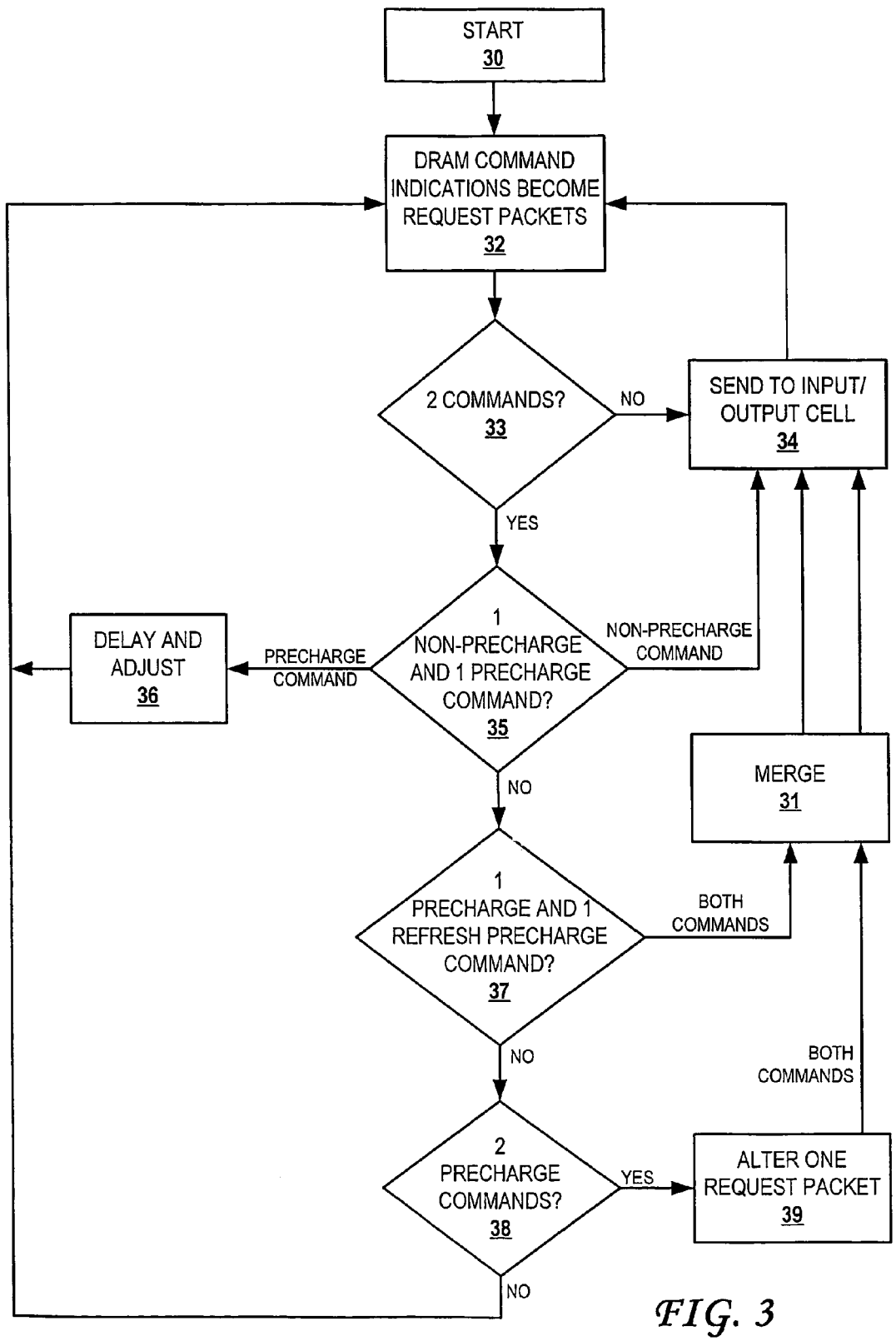
FIG. 3 is a high-level flow diagram of a method for the memory controller from FIG. 2 to locate an open command cycle for issuing a precharge packet, in accordance with a preferred embodiment of the present invention.

Referring now to FIG. 3, there is depicted a high-level flow diagram of a method for the memory controller from FIG. 2 to locate an open command cycle for issuing a precharge packet, in accordance with a preferred embodiment of the present invention. Starting at block 30, read and write commands from a bus, and refresh requests from a timer, are transformed by bank sequencers (from FIG. 2) into appropriate DRAM command indications. The DRAM command indications from bank sequencers and command mesher are then transformed by command encoders (from FIG. 2) into request packets, as depicted in block 32. A determination is made as to whether or not two commands arrive in command mesher 24 at the same time, as shown in block 33. If there is only one command, then the request packet is sent to input/output cell 15 (from FIG. 1), as depicted in block 34, and the process returns to block 32.

Otherwise, if two commands arrive in command mesher 24 at the same time, a determination is made as to whether or not one of the two commands is a non-precharge command (meaning an Act command or a Col command) and the other command is a Precharge or Refresh Precharge command, as shown in block 35. If one of the two commands is a non-precharge command and the other command is a Precharge or Refresh Precharge command, then the non-precharge command is allowed to proceed while the Precharge or Refresh Precharge command is delayed for one command cycle, as depicted in block 36. In addition, the dynamic offset of the Precharge or Refresh Precharge command is decremented, as depicted in block 36. For example, a Precharge+3 command is changed to a Precharge+2 command, a Precharge+2 command is changed to a Precharge+1 command, or a Precharge+1 command is changed to a Precharge+0 command. Similarly, a Refresh Precharge+3 command is changed to a Refresh Precharge+2 command, a Refresh Precharge+2 command is changed to a Refresh Precharge+1 command, or a Refresh Precharge+1 command is changed to a Refresh Precharge+0 command.

Otherwise, if both commands are precharge commands, then another determination is made as to whether or not one command is a Precharge command while the other command is a Refresh Precharge command, as shown in block 37. If one command is a Precharge command while the other command is a Refresh Precharge command, then both commands are merged into one request packet, as shown in block 31, and are sent to input/output cell 15 (from FIG. 1).

Otherwise, a determination is made as to whether or not both commands are Precharge commands, as depicted in block 38. If both commands are Precharge commands, then one of the request packets is altered (i.e., POP field moved to ROP field), as shown in block 39, and the commands are merged into one request packet, as shown in block 31, and are sent to input/output cell 15 (from FIG. 1). Otherwise, no request packet is sent to input/output cell 15, and the process returns to block 32.

As has been described, the present invention provides a memory controller capable of locating an open command cycle to issue a precharge packet. The memory controller of the present invention performs collision detection and merges precharge commands when necessary. The memory controller of the present invention allows for simpler, smaller, independent bank sequencers at the expense of a more complicated command mesher. The memory controller of the present invention does not include checks to make sure that precharge-to-precharge time for same bank sets (i.e., $t_{PP}$) and precharge-to-precharge time for different bank sets (i.e., $t_{PP\_D}$) are met. Such intelligence is located at the front end of the memory controller, which is beyond the scope of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for a memory controller to locate an open command cycle for issuing a precharge packet when no other packet is currently occupying a bus, said method comprising:

in response to a receipt of two request packets concurrently, determining whether both of said request packets includes a Precharge command, and determining whether one of said request packets includes a non-precharge command and the other one of said request packets includes a Precharge command;

in a determination that both of said request packets includes a Precharge command,
      altering at least one command field within one of said request packets; and
      merging and sending said merged request packet to said input/output cell; and in a determination that one of said request packets includes a non-precharge command and the other one of said request packets includes a Precharge command,
      immediately sending said request packet having a non-precharge command to an input/output cell;
      delaying said request packet having a Precharge command for one command cycle; and
      changing dynamic offset of said Precharge command.

2. The method of claim 1, wherein said method further includes
   determining whether one of said request packets includes a Precharge command and the other one of said request packets includes a Refresh Precharge command; and
   in a determination that one of said request packets includes a Precharge command and the other one of said request packets includes a Refresh Precharge command, merging and sending said merged request packet to said input/output cell.

3. The method of claim 1, wherein said non-precharge command is an Act or Col command.

4. The method of claim 1, wherein said Precharge command is a Precharge+3 command, a Precharge+2 command, or a Precharge+1 command.

5. The method of claim 1, wherein said memory controller is for controlling extreme data rate (XDR) memories.

* * * * *